Aug. 28, 1956     W. M. LE SUER     2,760,970
PROCESS FOR THE PREPARATION OF SUBSTANTIALLY PURE
METAL SALTS OF ORGANIC SULFONIC ACIDS
Filed April 6, 1953
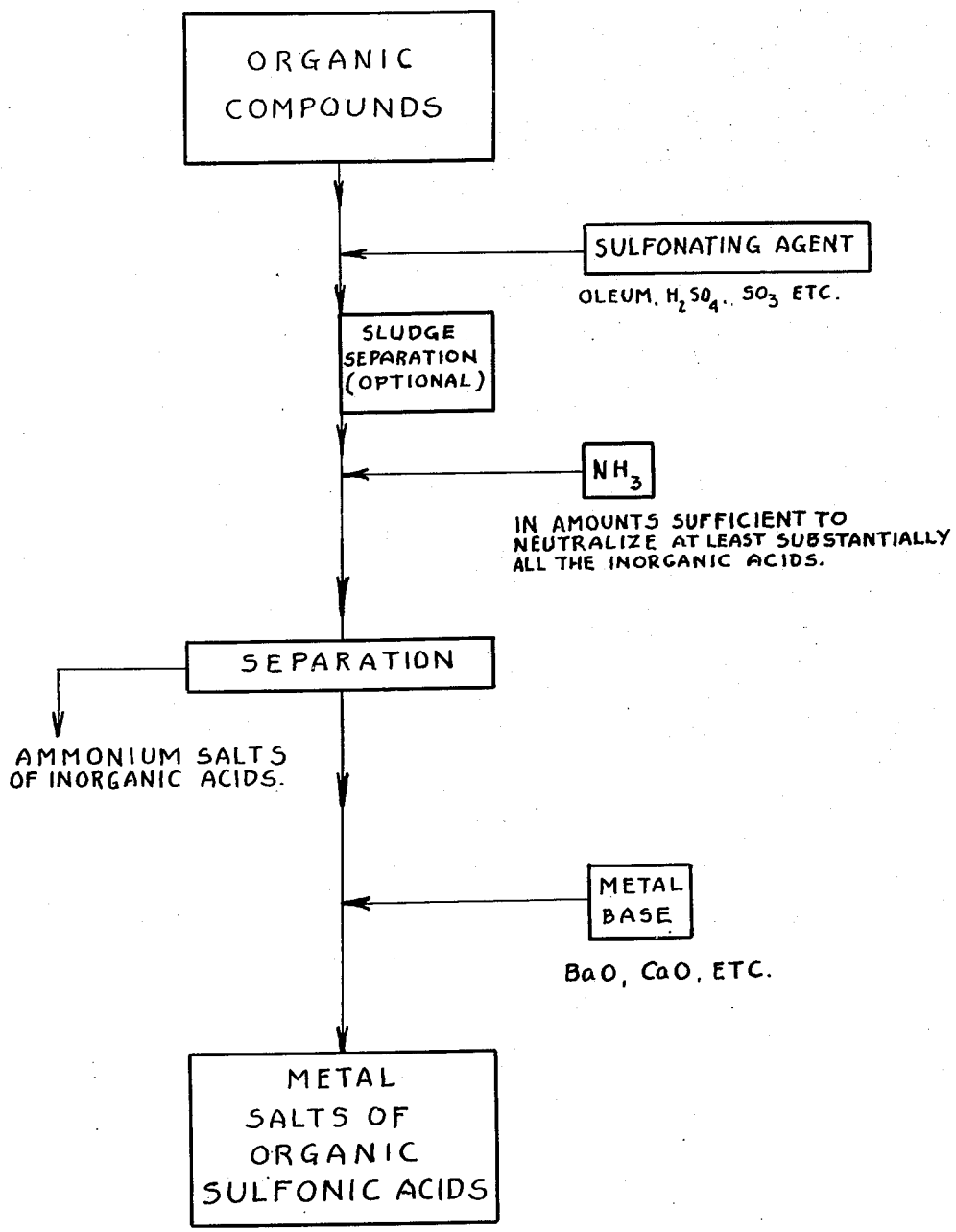
INVENTOR.
WILLIAM M. Le SUER
BY
Oberlin & Limbach
ATTORNEYS.

United States Patent Office
2,760,970
Patented Aug. 28, 1956

2,760,970

PROCESS FOR THE PREPARATION OF SUBSTANTIALLY PURE METAL SALTS OF ORGANIC SULFONIC ACIDS

William M. Le Suer, Euclid, Ohio, assignor to The Lubrizol Corporation, Wickliffe, Ohio, a corporation of Ohio Application April 6, 1953, Serial No. 347,115

12 Claims. (Cl. 260—429)

This invention relates to the preparation of substantially pure sulfonated products, and more particularly to the novel method of preparing substantially pure metal salts of organic sulfonic acids.

All economically feasible methods for preparing metal salts of organic sulfonic acids include the steps of reacting organic compounds with a sulfonating agent, separating the acid sludge from the sulfonated product, and neutralizing the sulfonated product with a metal base to form the metal salts. The sulfonation may be carried out with a variety of sulfonating agents, such as sulfuric acid, oleum, or sulfur trioxide. In some instances the sulfonation is carried out in successive stages, adding the sulfonating agent in successive charges, and in such instances the acid sludge resulting from each charge is removed before the addition of the next charge. Despite the removal of the acid sludge after sulfonation, the sulfonated product mixture resulting from the sulfonation still contains appreciable amounts of unchanged inorganic sulfonating agent. The removal of this contaminant has been the subject of much study, and in the past entailed many expensive and inconvenient operations. One of the difficulties resides in the mutual solubility characteristics of the sulfonated product and its salts with the inorganic acid contaminants and their salts. Another difficulty arises from the ability of the metal salts, especially the polyvalent metal salts, of the sulfonated products to act as dispersants for the metal salts of the inorganic acid contaminants and hold the latter in colloidal suspension. The result is a hazy solution which is unsuitable for many purposes.

The extraction of the inorganic contaminants with aqueous solutions is quite often unsatisfactory, since some of the water after such extraction remains dispersed in the product in the form of an aqueous emulsion. This makes the product unfit for many uses, such as motor oil detergents or dispersants where the presence of water is harmful and corrodes and rusts the lubricated metal parts.

A typical method of preparing sodium sulfonates involves neutralization of the crude sulfonated product, obtained as described above from the sulfonation step and removal of acid sludge, with sodium carbonate, extraction of this neutralized product with aqueous isopropyl alcohol, and removal of the alcohol by distillation. The product still contains considerable quantities of salts and may be purified further by treatment with isopropyl alcohol, removal of the separated salt brine, and concentration of the sodium sulfonate.

The preparation of polyvalent metal sulfonates involves, in general, a combination of the above-described process plus a double decomposition reaction of the sodium sulfonate with the particular polyvalent metal chloride. If the crude sulfonated product is neutralized directly with a polyvalent metal base the resulting mixture of organic and inorganic salts cannot be separated satisfactorily because of the property of the polyvalent metal sulfonate of dispersing into colloidal solution the polyvalent metal sulfate; the result is a hazy solution which cannot be clarified conveniently and which is unsatisfactory for many uses. Consequently it is frequently preferable to prepare the polyvalent metal sulfonates from the sodium sulfonates rather than directly from the sulfonic acids.

It is accordingly an object of this invention to provide an improved method for the preparation of substantially pure metal salts of sulfonic acids, and for the preparation in particular of substantially pure polyvalent metal salts of organic sulfonic acids.

Another object is the preparation of substantially pure materials which may be used as dispersants and detergents in lubricants, especially in crankcase oils.

Other objects of the invention will be apparent from the following description thereof.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In accordance with this invention it has been discovered that metal salts of sulfonic acids, and in particular metal salts of oil-soluble alkylated aromatic sulfonic acids, can be prepared by way of a more convenient method than has heretofore been available. This novel method and the metal sulfonates available therefrom comprises the subject matter of the following description.

Broadly stated, the invention comprises the method of separating organic acidic components from inorganic sulfur acid contaminants comprising the steps of treating the mass comprising organic acidic components and inorganic sulfur acid contaminants with substantially anhydrous ammonia in amounts sufficient to neutralize at least substantially all of said inorganic sulfur acid contaminants but less than 75% of the organic sulfonic acids, and under conditions so as to form as a solid phase the ammonia derivatives of said inorganic sulfur acid contaminants; and separating said solid phase of inorganic contaminants from the organic components, whereby the organic components are left substantially free from inorganic contaminants.

More particularly, the invention relates to the process for producing substantially pure oil-soluble metal salts of organic sulfonic acids which comprises:

(a) Sulfonating an organic compound with at least one sulfonating agent;

(b) Treating the acid mass with substantially anhydrous ammonia in such amounts and under such conditions as to neutralize at least substantially all of the inorganic acids present, but less than 75% of the organic sulfonic acids and to form as a solid phase the ammonia derivatives of the inorganic acid contaminants;

(c) Separating the organic components and inorganic contaminants of the mass; and then (d) Reacting the organic component with a basically reacting metal compound in an amount and under such conditions as to form a metal salt of substantially all of said organic components.

SULFONATION

The step of sulfonation of organic compounds comprises contacting at least one organic compound with a sulfonating agent under conditions so as to form organic sulfonic acids.

The organic compound should be a sulfonatable organic compound free from reactive substituents which would prevent the normal sulfonation reaction from occurring. Such sulfonatable compounds should in most cases possess at least one replaceable hydrogen atom.

Suitable sulfonatable organic compounds include aromatic compounds having at least one resonant ring structure and having a replaceable hydrogen atom attached to a nuclear carbon atom. Especially preferred are aromatic hydrocarbon compounds.

By the term aromatic hyrdocarbon, as used in the specification and appended claims, is meant hydrocarbon compounds containing at least one resonant ring structure. More specifically it refers to benzene, biphenyl, naphthalene, antrhacene, phenanthrene, and their aliphatic hydrocarbon substituted derivatives. Suitable examples include benzene, toluene, xylene, methylethyl benzene, diethyl benzene, biphenyl, naphthalene, and the alkyl and cycloalkyl substitution products of these, such as, diisobutyl-substituted benzene, diisobutyl-substituted toluene, triisobutyl-substituted benzene, wax-substituted benzene, nonyl benzene, polydodecyl benzene, polydodecyl toluene, polydodecyl naphthalene, terpene-substituted benzene, kerosene-substituted benzene, aromatic extracts or fractions of petroleum, e. g. solvent-extracted petroleum oil, preferably having a boiling point greater than 250° F., etc. Preference is given the aliphatic hydrocarbon-substituted benzenoid hydrocarbons in which the aliphatic hydrocarbon groups contain a total of from 1 to 60 carbon atoms, and special preference is given to those in which the aliphatic hydrocarbon groups contain a total of from 8 to 40 carbon atoms.

Suitable sulfonation agents include sulfuric acid, oleum, sulfur trioxide, or chlorsulfonic acid. Preference is given to concentrated sulfuric acid, oleum, and sulfur trioxide, with special preference given to oleum. Advantageous results were obtained with oleum containing from about 20% to about 65% sulfur trioxide.

The temperature of sulfonation steps may vary within the range from about −20° C. to about 100° C. Ordinarily it is desirable to carry out the sulfonation process within the range from about 25° C. to about 75° C., since lower temperatures tend to retard sulfonation and higher temperatures do not afford any outstanding advantages and tend to cause cleavage of long chain alkyl groups and effect oxidation and partial polymerization of olefinic fragments resulting from such cleavage.

The reaction periods for sulfonation range from about 5 to about 60 minutes or more. Generally about 15 to 20 minutes are sufficient to effect complete sulfonation per a charge of sulfonating agent. It will be realized, however, that the sulfonation time will depend to a certain extent on the amount of material being sulfonated.

It may be desirable in some instances to perform the sulfonation step in the presence of about 1.5 volumes of a low boiling diluent, such as n-butane, per volume aromatic hydrocarbon. Rises in temperature resulting from sulfonation vaporizes a portion of such diluent, and the resulting cooling effect tends to maintain the reaction temperature at a constant level, thereby eliminating local high temperatures in the reaction vessel. The diluent may be removed later by vaporization.

SLUDGE SEPARATION

Upon allowing the reaction mixture to stand after sulfonation of the organic compounds, the mixture separates into an upper organic sulfonic acid layer and a lower acid sludge layer. If the organic compound is a petroleum fraction the upper layer contains mahogany sulfonic acids and the lower layer may contain green sulfonic acids.

It may be desirable to separate the acid sludge layer from the sulfonic acids prior to ammonia treatment. In the batch process, if successive charges of a sulfonating agent are used, it may be desirable to remove the acid sludge layer after each charge. In the continuous type operation the reaction mass is transferred to a settling tank for sufficient time to allow settling of the acid sludge layer.

It should be understood that the above sludge separation step prior to ammonia treatment is optional and in some instances may be desirably omitted. Ordinarily, however, it is preferred to remove the acid sludge before ammonia treatment, since this method economizes the use of ammonia and provides a more satisfactory product for certain uses, such as a motor oil dispersant and detergent. Furthermore, the acid sludge can be treated to restore its sulfonating properties and can be reused in the sulfonation process.

AMMONIA TREATMENT

In the ammonia treatment step, the mass, comprising organic sulfonic acids and inorganic sulfur acid contaminants, is treated with substantially anhydrous ammonia to form, as a solid phase, or precipitate, the ammonia derivatives of the inorganic sulfur acid contaminants.

The substantially anhydrous ammonia is added to the mass in gaseous form. The anhydrous gas is merely bubbled in below the surface of the mass. The addition of a small amount of water to the mass, for example 0.01 percent to 5 percent by weight per weight of the sulfonated product, prior to neutralization with anhydrous ammonia is desirable in some instances, although not essential. If water is added, the weight thereof preferably should be less than the weight of ammonia to be introduced for best results. The temperature at which the anhydrous ammonia is added is within the range of from about 30° C. to about 100° C., preferably below 70° C.

The amount of anhydrous ammonia added should be sufficient to neutralize at least substantially all of the inorganic sulfur acid contaminants present, and preferably a partial amount, less than 75%, and most desirably less than 60%, of the organic sulfonic acids. The fact that the anhydrous ammonia reacts first with inorganic sulfur acid contaminants makes it possible to neutralize only the contaminants, if desired. However, it is usually preferred to neutralize also a partial amount, less than 75%, of the organic sulfonic acids to insure the complete neutralization of the contaminants. Neutralization of more than 75% of the organic sulfonic acids was found not to offer any advantages in the process, but increased the cost of operation, and decreased the quality of the product.

When all the anhydrous ammonia has been added the mixture is agitated for a period of time, usually about an hour or so, to effect neutralization.

The inorganic sulfur acid derivatives have been converted to a solid phase after this step and can now be separated from the oil soluble organic component.

SEPARATION

In the separation step, the insoluble materials, solid phase, or precipitate consisting of the ammonia derivatives of the inorganic sulfur acid contaminants is separated from the oil-soluble organic components by decantation, centrifugation, or filtration, the latter being preferred. The separation step may be performed at ordinary room temperatures, or at elevated temperatures, preferably below 70° C.

After the ammonia derivatives of the inorganic sulfur acid contaminants have been removed, the organic component is substantially free of said contaminants.

NEUTRALIZATION WITH METAL BASE

The organic component in which the active chemical compounds consist of organic sulfonic acids and their ammonium salts, as prepared by the preferred methods above, is converted to the metal sulfonate by reacting with at least one basic metal compound, such as a metal oxide, hydroxide or carbonate.

The metal bases which may be employed in accordance with this invention are exemplified by the oxides, hydroxides, and carbonates of the monovalent and polyvalent metals. The monovalent metals are sodium, potassium, and lithium. The polyvalent metals include calcium, magnesium, strontium, barium, zinc, aluminum, lead, copper, tin, chromium, cobalt, cadmium, etc. Preference is given the polyvalent metals, with special preference given the alkaline earth metal group which consists of calcium, strontium, and barium.

The temperature of reaction should be sufficiently elevated to cause the reaction of the ammonium salts and basic metal compounds, with the liberation and driving off of ammonia, and replacement by metal. This is accomplished at temperatures between 50° C. and 200° C., and preferably between 50° C. and 100° C.

In the preferred mode of operation the basic metal compound is added in small portions to the organic sulfonic acids, or ammonium sulfonates, or mixtures thereof. When all of the basic metal compound has been added the mixture is heated for an additional period of time, usually from about 0.5 to about 2.0 hours or more.

The amount of metal base added will depend on the type of product desired. If a mixture of metal sulfonate and ammonium sulfonate is desired, for example, then an amount of metal base, sufficient to neutralize all of the sulfonic acids which may be present, but insufficient to react with all of the ammonium sulfonate, is used. If a normal metal sulfonate is desired, an amount of metal base is used which is either chemically equivalent or slightly in excess of the combined amounts of ammonium sulfonate and sulfonic acid. If a basic metal sulfonate is desired, amounts of metal base in substantial excess of those required to form the normal method sulfonate are used.

The term "metal ratio" as used in this specification is the ratio of equivalents of total metal to equivalents of metal in the sulfonate group and is an indication of the amount of excess metal in the product. If a product having a high metal ratio is desired, it is preferable to add, in addition to an excess of metal base, water, and promoters, such as, for example phenolic and enolic (tautomeric) compounds, low molecular weight sulfonic acids, phosphorus acids, etc., preferably phenolic compounds, as disclosed in Patent Nos. 2,616,904; 2,616,905; 2,616,906; 2,616,911; 2,616,924; 2,616,925; 2,617,049. The high metal ratio products are generally preferred for use as motor oil detergents or dispersants.

In the preparation of high metal ratio products using promoters, an excess of metal base is added to the sulfonic acids, or ammonium sulfonates, or mixtures thereof, together with promoter and water. The resultant mixture is heated with agitation and the product dried by heating for a short time at 150° C. This product is filtered, yielding the desired basic metal sulfonate. The product may be treated with a filter aid prior to filtration. If a substantially neutral product is desired, the product is treated with an acidic material such as carbon dioxide, carbon disulfide, sulfur dioxide, etc. until the titratable alkalinity is substantially reduced. Such treatment may be effected either before or after filtration.

The present process may be carried out by a batch or continuous type of operation. In the batch process the sulfonation may be carried out in stages or in one operation. Thus, when the sulfonating agent used is sulfuric acid monohydrate, or the like, it may be desirable to add the sulfonating agent in successive charges, removing the resultant acid sludge layer before the next successive charge is added. Addition of the sulfonating agent in this manner allows the removal of the spent sulfonating agent as it is formed preventing dilution of the unused sulfonating agent. The utilization of stronger sulfonating agents, such as oleum or sulfur trioxide allows the sulfonation to be carried out in a single charge operation. In a typical continuous operation, the organic compound is heated to the desired reaction temperature and then contacted with oleum to effect sulfonation. The reaction mixture may be agitated with the aid of suitable agitators such as revolving sitters or baffles to obtain intimate contact between reactants. If oleum or sulfur trioxide is used, water may be added to convert the excess sulfur trioxide and used sulfuric acid into sulfuric acid monohydrate and the resultant mixture transferred to a settling tank for sufficient time for the sulfuric acid monohydrate to separate as a lower layer and the organic sulfonic acid as the upper layer. The mass is treated with ammonia, the solids separated out by filtration, decantation, or centrifugation, and then reacted with the desired metal base.

The present process may be further illustrated by the following examples which are not to be construed as limiting the scope of the invention. In the examples all parts are by weight.

Example 1

To 1600 parts of polydoceyl benzene was added with stirring 1760 parts of 20 percent oleum over a period of one hour. The mixture was maintained within the temperature range of 25–40° C. throughout this hour, external cooling being required to counteract the evolved heat of the exothermic reaction. After all the oleum had been added the mixture was stirred at 30–40° C. for an additional 1.5 hours then heated to 50° C., mixed well with 1000 parts of mineral lubricating oil, and allowed to stand for about 2–3 hours, until acid sludge separation was essentially complete. The black acid sludge was removed from the brown organic phase.

To the organic phase was added 40 parts of water, and 65 parts of ammonia was passed in under the surface of the stirred mixture at such a rate that the temperature did not rise above 70° C. The mixture was stirred for one hour after all the ammonia had beend added and then was filtered. The filtrate was shown to have an acid number of 99, using phenolphthalein as an indicator (at pH range of 8.0–9.8) and 38, using bromphenol blue as an indicator (at pH range of 3.0–4.6). This indicates that about 60 per cent of the sulfonic acid was neutralized with ammonia and that the remaining 40 per cent is present as free sulfonic acid, since only the free sulfonic acid is titrated below a pH of 3.0–4.6, whereas above that, but below a pH of 8.0–9.8, ammonium sulfonate is titrated.

The sulfonic acid-ammonium sulfonate mixture was diluted further by the addition of 2720 parts of mineral lubricating oil, and 408 parts of water and 565 parts of diisobutyl phenol were added. This mixture was heated to 70° C. with agitation and 1715 parts of barium oxide was added portion-wise, care being taken to avoid excessive foaming. After the barium oxide addition was complete the mixture was heated at reflux temperature for one hour and then was dried by heating at 150° C. The mixture then was treated with carbon dioxide at 150–160° C. until it was neutral to phenolphthalein; 45 minutes of such treatment was necessary. The mixture was treated with a siliceous filter aid and filtered. The filtrate was shown by analyses to have the following:

| | |
|---|---|
| Sulfate ash | percent 31.6 |
| Basic No. | 5.2 |
| Nitrogen content | percent 0.014 |
| Metal ratio | 4.67 |

Example 2

To 2751 parts of the acid sludge-free organic phase, as obtained in Example 1, was added 40 parts of water, and 47 parts of ammonia was passed in under the surface of the stirred mixture at such a rate that the temperature did not rise above 70° C. The mixture was stirred for 1.5 hours after all the ammonia had been added and then was filtered, yielding 2529 parts of a filtrate which had an acid number of 81. This filtrate was diluted with 1500 parts of mineral lubricating oil, 240 parts of water was added, and 278 parts of barium oxide was added portion-wise at 50–90° C., care being taken to avoid excessive foaming. The mixture was heated at reflux temperature for one hour, then at 150° C. for one hour, then was treated with a siliceous filter aid and was filtered. The filtrate was shown by analyses to have the following:

| | |
|---|---|
| Sulfate ash | percent 9.7 |
| Basic No | 0.6 |
| Nitrogen content | Trace |
| Metal ratio | 1.0 |

Example 3

To 410 parts of polydodecyl toluene there was added dropwise over a period of one hour, and with stirring, 440 parts of 20 percent oleum. The temperature was held at 25–40° by virtue of water-cooling. When the oleum addition was complete 250 parts of oil was added and the resulting mixture was allowed to stand for 2.5 hours, whereupon an acid sludge layer was withdrawn. The 618 parts of organic layer had an acid number of 166. To this organic layer there was added 10 parts of water and then 20 parts of gaseous ammonia was added within a temperature range of 30–70° C. This neutralized mixture was treated with a siliceous filter aid and filtered, yielding 442 parts of filtrate having an acid number (to phenolphthalein) of 77 and (to bromphenol blue) of 27.

This filtrate was heated for one hour at 100–105° C. with 48 parts of barium oxide, 220 parts of oil and 50 parts of water. The resulting mixture was dried at 160° for an hour, then filtered through a filter aid. The filtrate showed the following:

| | |
|---|---|
| Sulfate ash | percent 10.3 |
| Basic No | Nil |
| Metal ratio | 1.0 |

Example 4

To 420 parts of polydodecyl naphthalene there was added dropwise and with stirring over a period of one hour, 135 parts of 65 per cent oleum. The temperature was maintained by cooling, at 25–40° C. When the addition was complete 10 parts of water was added, whereupon 20 parts of gaseous ammonia was added at 30–70° C. The viscosity of the product was diminished by dilution with 250 parts of oil. A siliceous filter aid was added and the product was filtered at 70° C. The filtrate showed an acid number (to phenolphthalein) of 31.5.

The above filtrate was heated at 100–105° C. with a suspension of 21.5 parts of barium oxide in 25 parts of water, then dried by heating at 150–160° C. for an hour. A siliceous filter aid was added and the product was filtered yielding 407 parts of a liquid having the following analyses:

| | |
|---|---|
| Sulfate ash | percent 6.25 |
| Basic No | 1.3 |
| Metal ratio | 1.0 |

Example 5

To 1600 parts of a solvent-extracted mid-continent petroleum oil there was added dropwise and with stirring over a period of one hour, 1760 parts of 20 percent oleum. The temperature was maintained at 25–40° C. throughout the addition. The sulfonation mixture was diluted with 100 parts of oil, then allowed to stand four hours whereupon an acid sludge layer was removed. The remaining organic portion consisted of two layers. The bottom of these was separated as sulfonated material and was treated successively with 10 parts of water and 10 parts of gaseous ammonia, then filtered. The filtrate showed an acid number (to phenolphthalein) of 17.3. It was treated for one hour at 100–105° C. with 40 parts of barium oxide, then dried by heating at 150–160° C. for an hour. A siliceous filter aid was added and the product was filtered yielding 1604 parts of a clear liquid having the following analyses:

| | |
|---|---|
| Sulfate ash | percent 2.9 |
| Acid No | 3.0 |
| Metal ratio | 1.0 |

Example 6

To 1600 parts of polydodecyl benzene at 25–40° C., there was added 1760 parts of 20 percent oleum. The mixture was heated at 40–50° C. for 30 minutes, diluted with 1000 parts of mineral oil, and allowed to stand until an acid sludge layer had settled out. This sludge was removed. The organic layer was treated with 64 parts of ammonia at a temperature of 30–70° C. This material was filtered yielding 2313 parts of a filtrate having an acid number (to bromphenol blue) of 66.5 and (to phenolphthalein) of 83.5. Treatment of 670 parts of this material with 30 parts of barium oxide, 100 parts of water and 405 parts of oil yielded a product having the following analyses:

| | |
|---|---|
| Sulfate ash | percent 9.51 |
| Acid No | 0.33 |
| Nitrogen content | percent 0.017 |
| Metal ratio | 1.0 |

Other modes of applying the principle of the invention may be employed, change being made as regards the details described, provided the features stated in any of the following claims or the equivalent of such, be employed.

I therefore particularly point out and distinctly claim as my invention:

1. The process for producing substantially pure oil-soluble metal salts of organic sulfonic acids which comprises: (a) sulfonating an organic compound with at least one sulfonating agent of the class consisting of oleum, sulfuric acid, and sulfur trioxide, thereby forming an acid mass comprising organic sulfonic acid components and inorganic sulfonating agent acid contaminants; (b) treating said acid mass with substantially anhydrous ammonia in such amounts and under such conditions as to neutralize at least substantially all of said inorganic sulfonating agent acid contaminants present but less than 75% of the organic sulfonic acids and to form as a solid phase the ammonia derivatives of said inorganic sulfonating agent contaminants; (c) separating the organic components and inorganic sulfonating agent contaminants of the mass; and then (d) reacting the organic components with a basically reacting metal compound in such amounts and under such conditions as to form metal salts of substantially all of said organic components.

2. The process of claim 1 characterized further in that said organic compound is a hydrocarbon compound.

3. The process of claim 1 characterized further in that said organic compound is an aromatic hydrocarbon compound.

4. The process of claim 1 characterized further in that said organic compound is an alkyl benzene.

5. The process of claim 1 characterized further in that said organic compound is an alkyl naphthalene.

6. The process of claim 1 characterized further in that said organic compound is an aromatic petroleum fraction having a boiling point greater than 250° F.

7. The process of claim 1 characterized further in that said organic compound is dodecyl-substituted benzene.

8. The process of claim 1 characterized further in that said organic compound is dodecyl-substituted naphthalene.

9. The process of claim 1 characterized further in that said organic compound is dodecyl-substituted toluene.

10. In the process for preparing metal salts of organic sulfonic acids the method of separating organic acidic components from inorganic acidic contaminants comprising the steps of treating a mass comprising organic sulfonic acid components and inorganic acidic contaminants with substantially anhydrous ammonia in amounts sufficient to neutralize at least substantially all of said inorganic acid contaminants but less than 75% of the organic sulfonic acids, under conditions so as to form as a solid phase the ammonia derivatives of substantially all of said inorganic contaminants; and separating said solid phase of inorganic contaminants from the organic components, whereby said organic components are left substantially free from inorganic acid contaminants.

11. In the process for preparing metal salts of organic sulfonic acids the method of separating organic acidic components from inorganic acidic contaminants comprising the steps of treating a mass comprising aromatic hydrocarbon sulfonic acid and inorganic acidic contaminants with substantially anhydrous ammonia in amounts sufficient to neutralize at least substantially all of said inorganic acid contaminants but less than 75% of the aromatic hydrocarbon sulfonic acids, under conditions so as to form as a solid phase the ammonia derivatives of substantially all of said inorganic contaminants; and separating said solid phase of inorganic contaminants from the aromatic hydrocarbon components, whereby said aromatic hydrocarbon components are left substantially free from inorganic acid contaminants.

12. In the process for preparing metal salts of organic sulfonic acids the method of separating organic components from inorganic acidic contaminants comprising the steps of treating a mass comprising aromatic hydrocarbon sulfonic acids and inorganic sulfonating agent acidic contaminants with substantially anhydrous ammonia in amounts sufficient to neutralize at least substantially all of said inorganic sulfonating agent acid contaminants but less than 75% of the aromatic hydrocarbon sulfonic acids, under conditions so as to form as a solid phase the ammonia derivatives of substantially all of said inorganic contaminants; separating said solid phase of inorganic contaminants from the organic components, whereby said organic components are left substantially free from inorganic sulfonating agent acidic contaminants; and reacting a metal base with the aromatic hydrocarbon sulfonic acid components in such amounts and under such conditions so as to form the metal salts of said aromatic hydrocarbon sulfonic acids.

References Cited in the file of this patent
UNITED STATES PATENTS

| | | |
|---|---|---|
| 2,097,440 | Blumer | Nov. 2, 1937 |
| 2,187,883 | Lemmon | Jan. 23, 1940 |
| 2,307,953 | Potter | Jan. 12, 1943 |
| 2,451,549 | Gzemski | Oct. 19, 1948 |
| 2,501,732 | Mertes | Mar. 28, 1950 |
| 2,509,863 | Harlan | May 30, 1950 |
| 2,559,439 | Jones et al. | July 3, 1951 |
| 2,659,659 | Schmidl | Nov. 17, 1953 |